(12) United States Patent
Pattee

(10) Patent No.: US 11,701,273 B2
(45) Date of Patent: Jul. 18, 2023

(54) VEHICLE DOOR MOUNTED LIFT ASSIST DEVICE

(71) Applicant: Brooke B. Pattee, Lake Forest, CA (US)

(72) Inventor: Brooke B. Pattee, Lake Forest, CA (US)

( * ) Notice: Subject to any disclaimer, the term of this patent is extended or adjusted under 35 U.S.C. 154(b) by 28 days.

(21) Appl. No.: 17/543,643

(22) Filed: Dec. 6, 2021

(65) Prior Publication Data

US 2023/0172774 A1 Jun. 8, 2023

(51) Int. Cl.
*A61G 3/06* (2006.01)
*A61G 7/10* (2006.01)

(52) U.S. Cl.
CPC ............ *A61G 3/062* (2013.01); *A61G 7/1059* (2013.01); *A61G 7/1076* (2013.01); *A61G 2220/14* (2013.01); *Y10S 414/134* (2013.01)

(58) Field of Classification Search
CPC .... A61G 3/062; A61G 7/1001; A61G 7/1019; A61G 7/1059; A61G 7/1069; A61G 7/1076; A61G 2220/14; Y10S 414/134
USPC .................................................. 414/541, 921
See application file for complete search history.

(56) References Cited

U.S. PATENT DOCUMENTS

| | | | | |
|---|---|---|---|---|
| 3,172,551 A | * | 3/1965 | Wolfe ..................... | A61G 3/062 414/921 |
| 3,677,424 A | * | 7/1972 | Anderson .............. | A61G 3/062 414/921 |
| 5,540,539 A | * | 7/1996 | Wolfman ............... | A61G 3/062 414/921 |
| 9,217,535 B1 | * | 12/2015 | Egan ...................... | A61G 3/062 |
| 10,744,047 B2 | * | 8/2020 | Pattee .................... | A61G 3/062 |
| 2011/0268545 A1 | * | 11/2011 | Fakhrizadeh .......... | A61G 3/062 414/543 |

FOREIGN PATENT DOCUMENTS

DE 3413412 A1 * 10/1985 ......... Y10S 414/134

\* cited by examiner

*Primary Examiner* — James Keenan
(74) *Attorney, Agent, or Firm* — Felix L. Fischer

(57) ABSTRACT

A lift assist device employs a striker mounting assembly having a case with a receiving chamber having a top channel and a lower channel. A striker housing is removably insertable in the receiving chamber and has a receiver adapted to be inserted over a striker on a door of a vehicle. The striker housing has a top flange with an upper alignment aperture and a bottom flange with a lower alignment aperture, the upper alignment aperture and lower alignment aperture aligned with the top channel and lower channel with the striker housing inserted in the receiving chamber. A striker pin assembly is adapted for removable insertion through the top channel, upper alignment aperture into a striker on a door of a vehicle and through the lower aperture into the lower channel. A pivot assembly is engaged to the case with a pivot pin. A lift assembly has a mounting structure engaged to the pivot assembly with a telescoping support arm depending from the mounting structure. A seat is attached to a terminal end of the telescoping support arm.

16 Claims, 20 Drawing Sheets

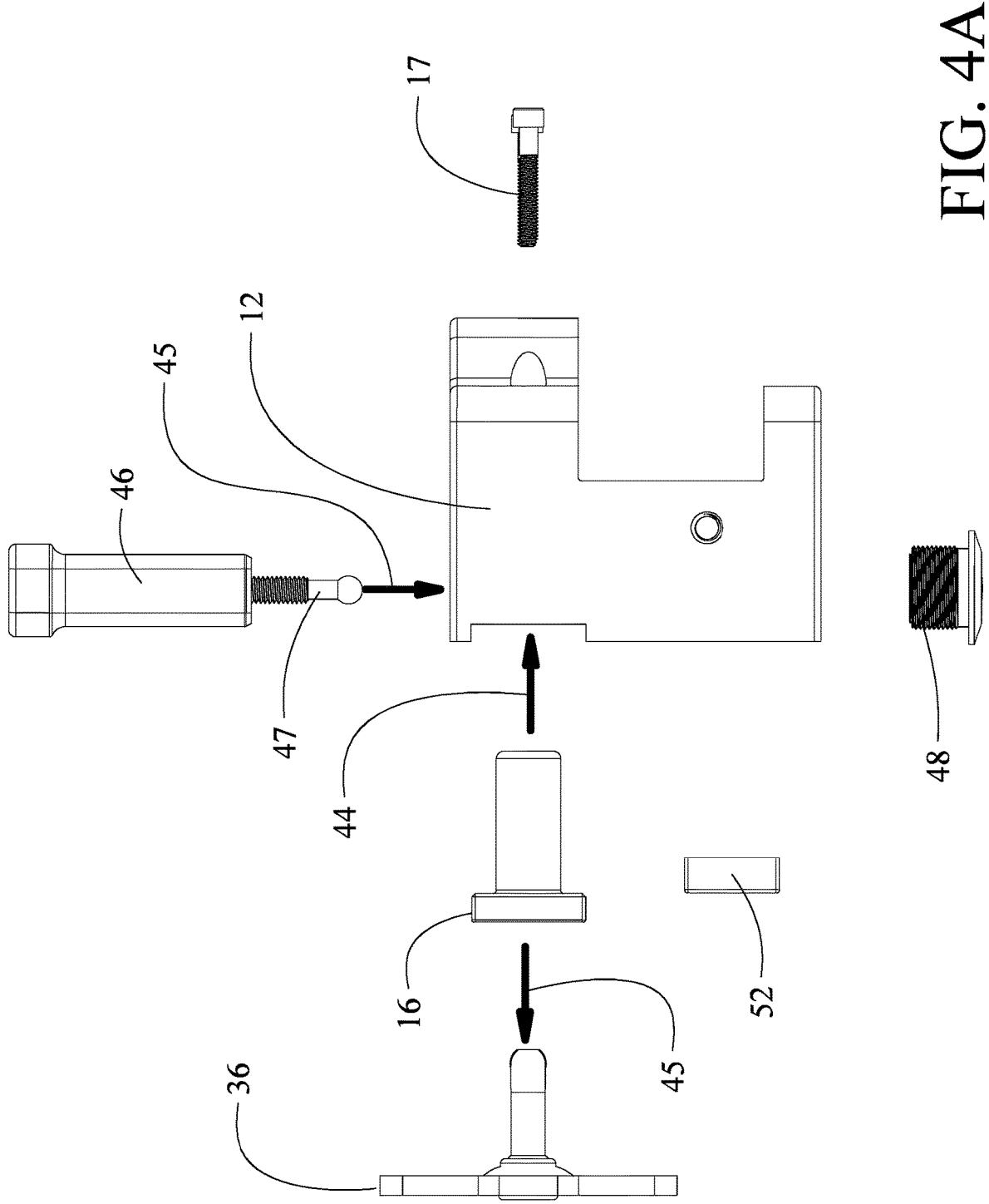

VEHICLE DOOR MOUNTED LIFT ASSIST DEVICE

BACKGROUND

Field

This invention relates generally to the field of lifting devices to assist the disabled or elderly and more particularly to a lift assist device employing a removable attachment assembly received on a vehicle door striker and a swiveling actuator and seat assembly removably engaged to the attachment assembly.

Description of the Related Art

Assisting the elderly or disabled into a vehicle for transportation is typically accomplished either by direct lifting of the individual by an assistant or aide or through lift or ramp devices that are custom designed and permanently attached to the vehicle. Directly lifting the individual may result in injury to the assistant or to the individual. Custom designed lift or ramp assemblies require extensive modification of a vehicle and are expensive. Further, only the modified vehicle may be used for transportation of the individual.

It is therefore desirable to provide a device which is easily removably attachable to a vehicle to provide lifting capability to allow transfer of an individual into the vehicle.

SUMMARY

The embodiments disclosed herein overcome the shortcomings of the prior art by providing a lift assist device employing a striker mounting assembly having a case with a receiving chamber having a top channel and a lower channel. A striker housing is removably insertable in the receiving chamber and has a receiver adapted to be inserted over a striker on a door of a vehicle. The striker housing has a top flange with an upper alignment aperture and a bottom flange with a lower alignment aperture, the upper alignment aperture and lower alignment aperture aligned with the top channel and lower channel with the striker housing inserted in the receiving chamber. A striker pin assembly is adapted for removable insertion through the top channel, upper alignment aperture into a striker on a door of a vehicle and through the lower aperture into the lower channel. A pivot assembly is engaged to the case with a pivot pin. A lift assembly has a mounting structure engaged to the pivot assembly with a telescoping support arm depending from the mounting structure. A seat is attached to a terminal end of the telescoping support arm.

BRIEF DESCRIPTION OF THE DRAWINGS

These and other features and advantages of the present invention will be better understood by reference to the following detailed description of exemplary embodiments when considered in connection with the accompanying drawings wherein:

FIG. 4A is an exploded side view of the striker, striker mounting assembly with the striker pin assembly and striker housing showing assembly directions;

DETAILED DESCRIPTION

Figure 1:
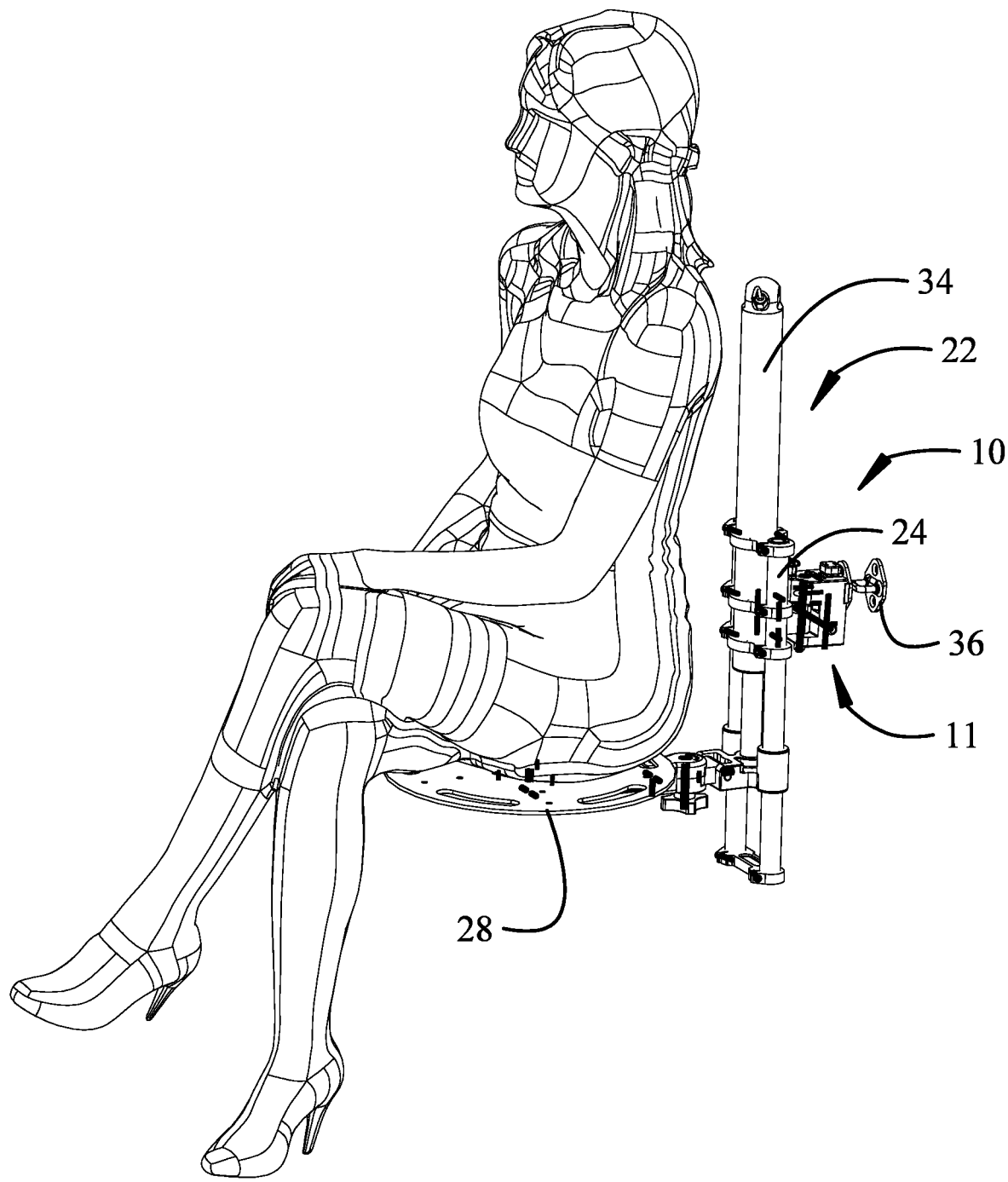
FIG. 1 is a front left pictorial depiction of an implementation of the door mounted lift assist device supporting a user.
Figure 2A:
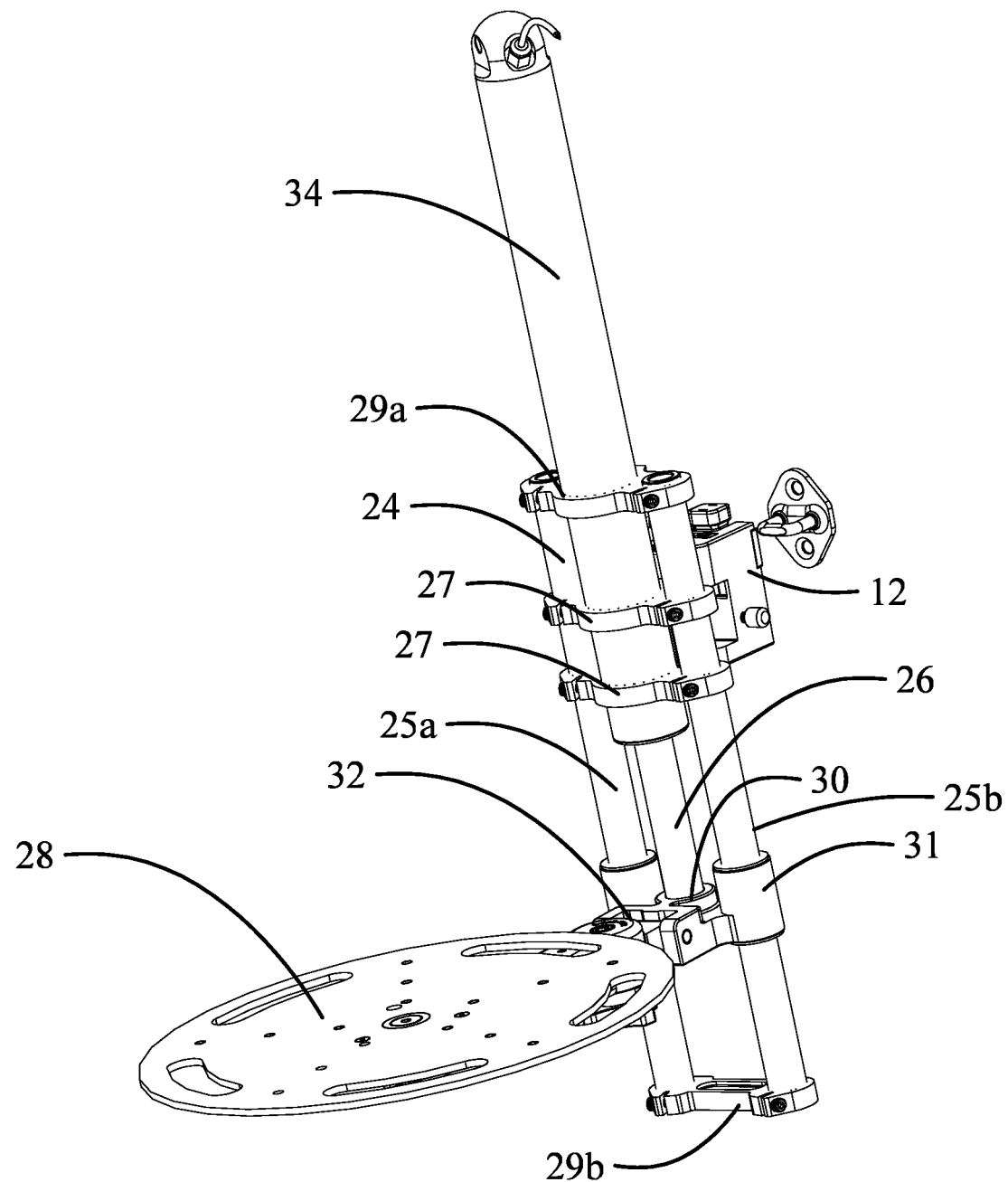
FIG. 2A is a front left pictorial depiction of the implementation.
Figure 2B:
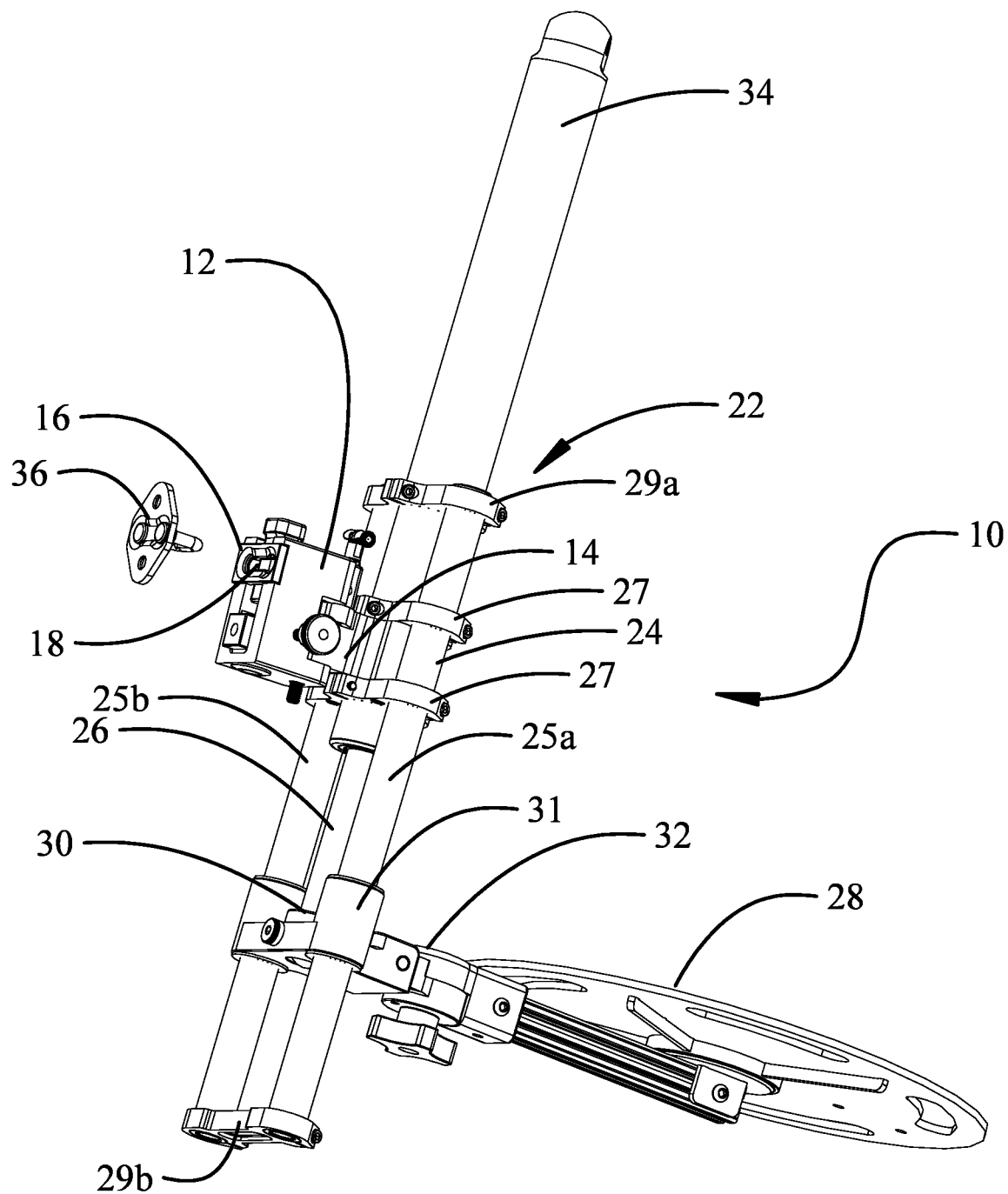
FIG. 2B is a rear right pictorial depiction of the implementation.

Embodiments shown in the drawings and described herein provide a door mounted lift assist device removably attachable to the striker of a vehicle door frame. A door attachment mechanism having a striker housing assembly, receiving the striker and secured with striker pin assembly, supports a pivot assembly rotationally engaging a lift assembly including an actuator and a seat. Referring to the drawings, FIGS. 1, 2A and 2B show a lift assist device 10 employing a striker mounting assembly 11 in which a pivot assembly 14 is mounted. A striker housing 16, removably received in a case 12 of the striker mounting assembly 11, has a receiver 18 for the striker 36 (shown separated from the vehicle door frame). A lift assembly 22 has a mounting structure 24 supported on the pivot assembly 14. A telescoping seat support arm 26 extends from an actuator 34 supported in the mounting structure 24 and a seat 28 is attached to a lower termination 30 of the support arm. For the example shown in the drawings, the seat 28 is attached to the lower termination 30 through a sliding link bracket 31 to an articulating mechanism 32 allowing the seat to be rotated upward to fold for compact storage or rotate in a horizontal plane to alter lateral position of the seat 28. The actuator 34 is operatively engaged to the support arm 26 to telescopically extend and retract the support arm to lower or raise the seated user. In the example implementation, the lift assembly is supported with parallel tubes 25a, 25b on which the link bracket 31 reciprocates with extension and retraction of the support arm 26. Tubes 25a and 25b are attached with at least one triple clamp 27 engaged to the pivot assembly. The actuator 34 is also rigidly engaged in the triple clamp 27. For the example implementation two triple clamps are employed as shown in FIGS. 2A and 2B. A top clamp 29a is secured to the actuator and rigidly attached to the top termination of the tubes 25a, 25b. A bottom clamp 29b is rigidly attached to the bottom termination of the tubes 25a, 25b.

Figure 3:
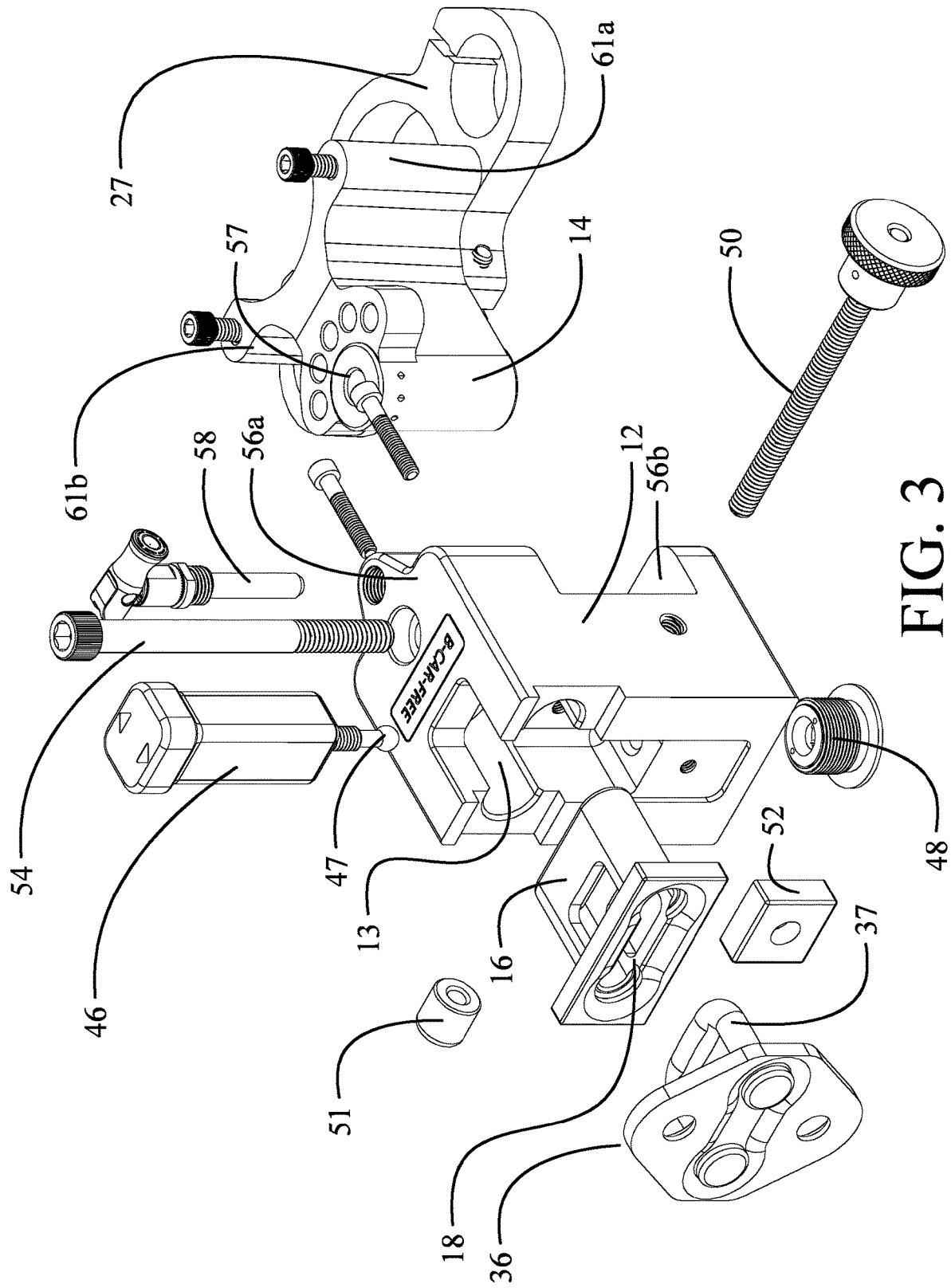
FIG. 3 is an exploded pictorial view of the striker, striker mounting assembly with the striker pin assembly and striker housing and the pivot assembly.
Figure 4B:
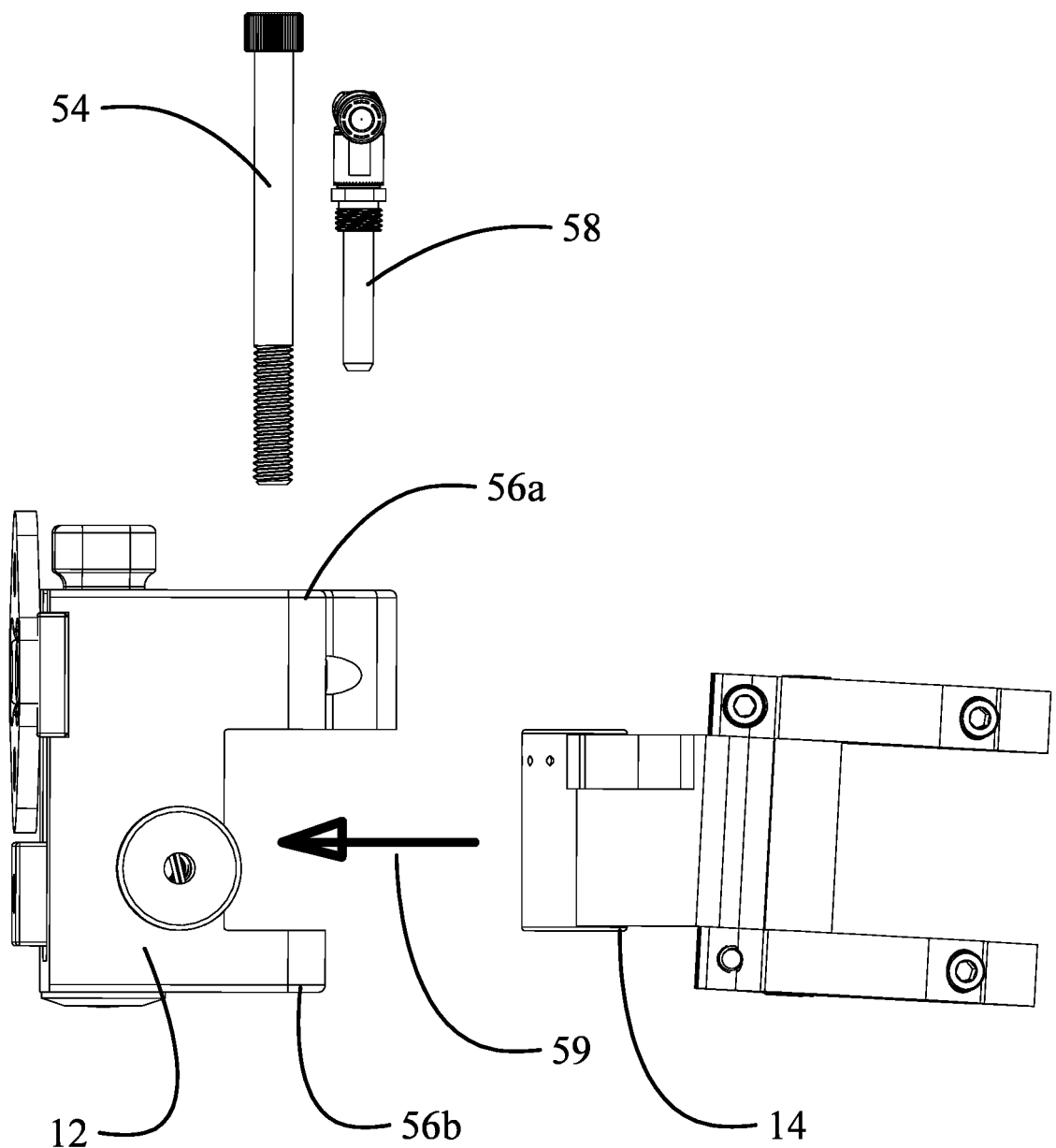
FIG. 4B is an exploded side view of the assembled striker and striker mounting assembly with the pivot assembly, pivot pin and locking pin showing assembly directions.

Detailed structure and operation of the striker mounting assembly 11 and striker housing 16 are shown in FIGS. 3, 4A and 4B. The lift assist device 10 is operable with a striker 36 which extends from a vehicle door frame (not shown). In most vehicles, for example, the front door frame extends into the B pillar of the body frame as the rear profile of the door frame and the striker 36 is attached to the door frame below the B pillar. The removable striker housing 16 is selected based on the vehicle type to match the striker 36 and inserted into a receiving chamber 13 in the striker mounting assembly case 12 as indicated by arrow 44 in FIG. 4A. The striker housing 16 is secured in the striker mounting assembly case 12 with bolts 17 or comparable fasteners.

Figure 5A:
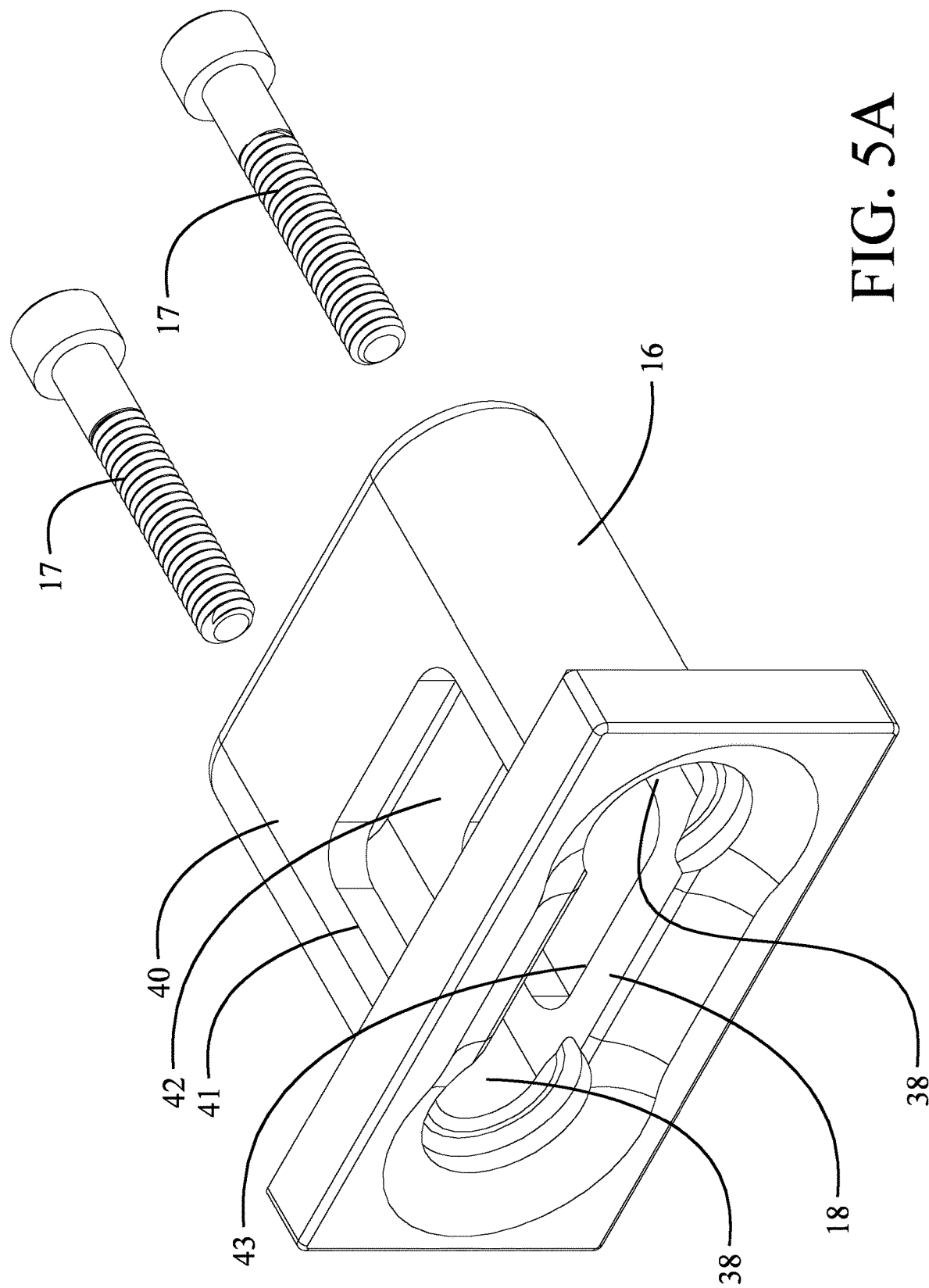
FIGS. 5A and 5B are front left upper and rear right lower pictorial views of the striker housing.
Figure 5B:
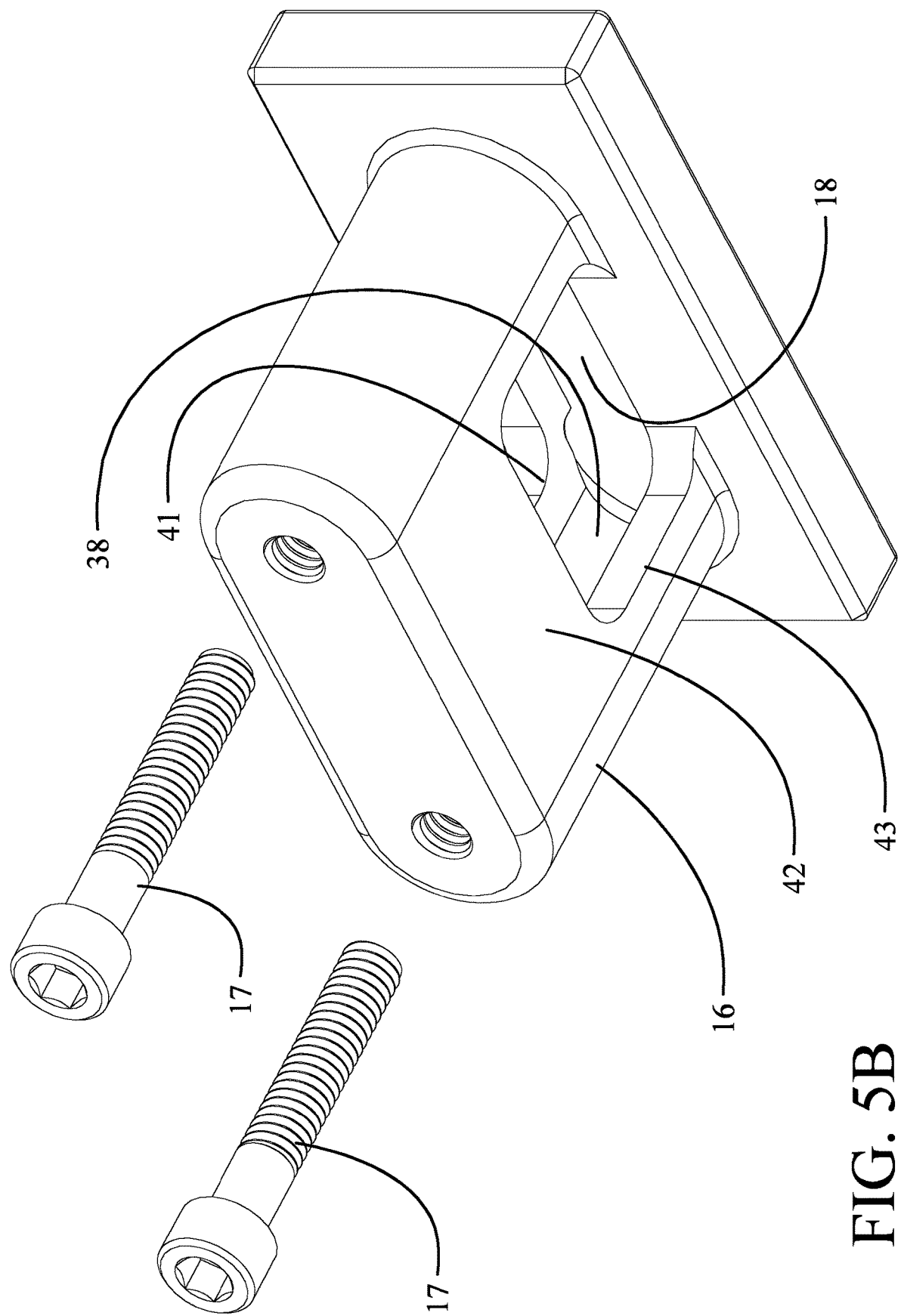
Figure 6A:
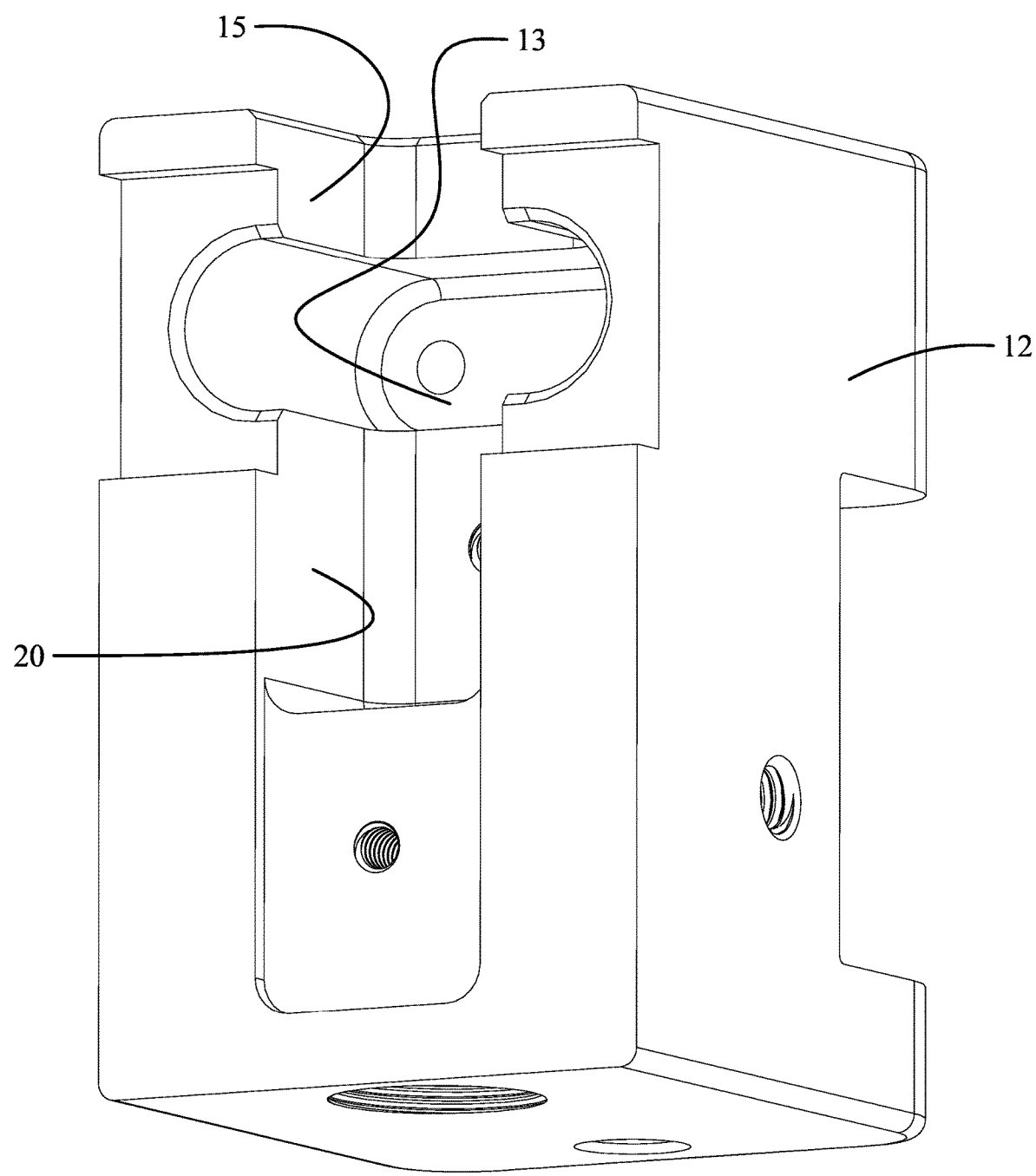
FIGS. 6A, 6B and 6C are rear right lower, front left lower and front left upper pictorial views of the striker mounting assembly case.
Figure 6B:
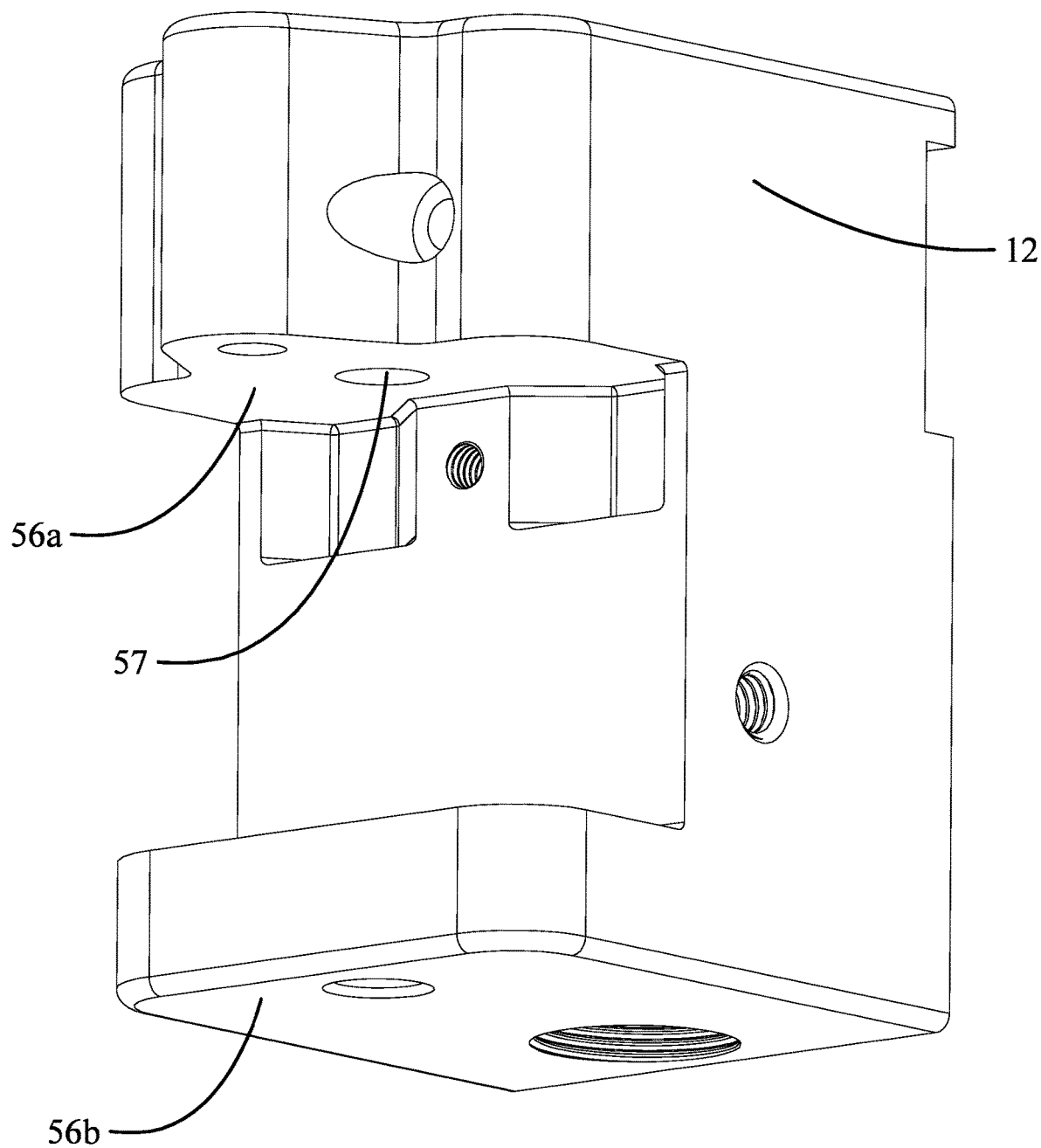
Figure 6C:
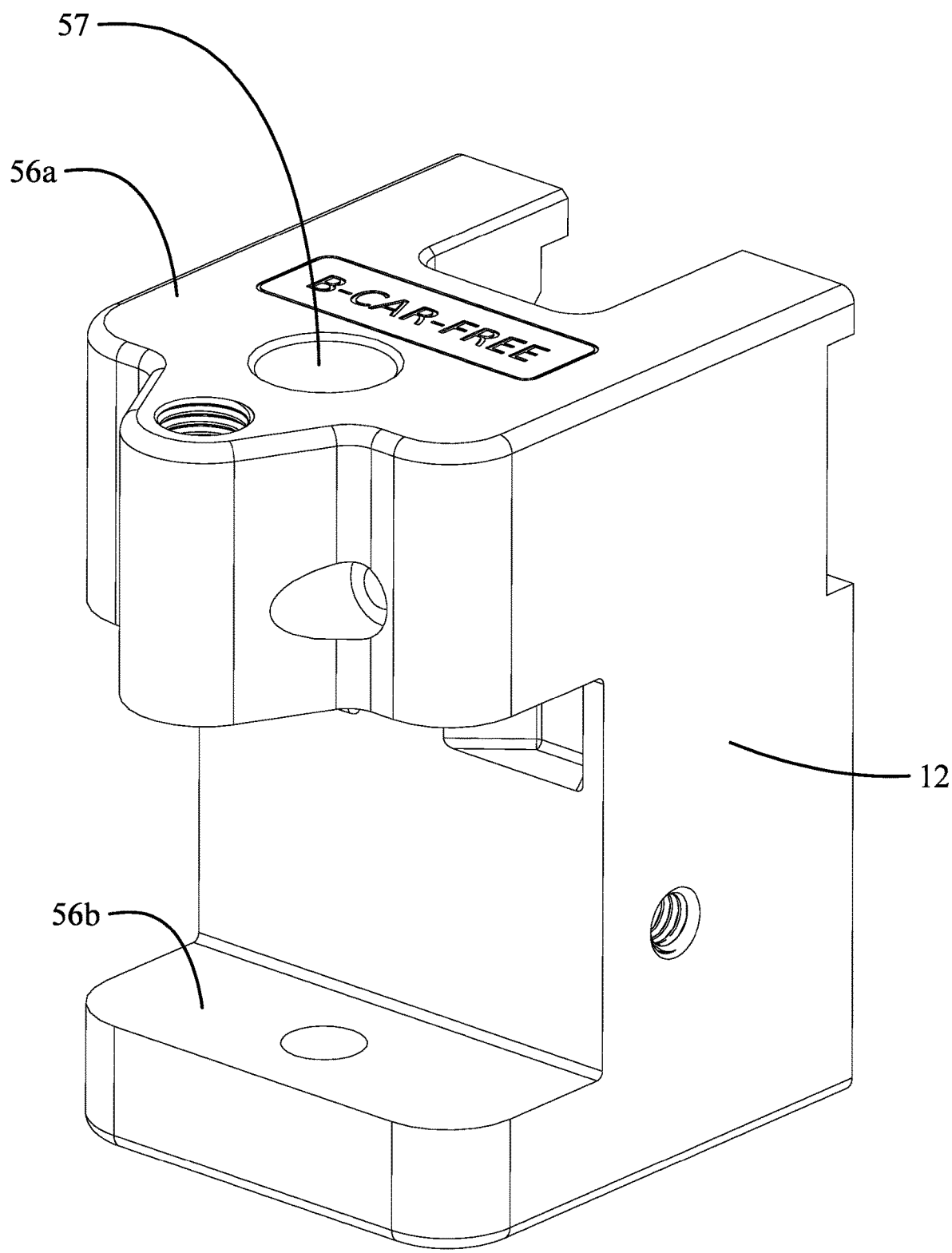

The striker housing 16 (shown in detail in FIGS. 5A and 5B) includes the receiver 18 which has contoured insert slots 38 allowing the striker housing 16 to be inserted over the striker 36, as indicated by arrow 45 in FIG. 4A, with the striker loop 37 closely received for stability. The striker housing 16 has a top flange 40 with an upper alignment aperture 41 and a bottom flange 42 with a lower alignment aperture 43. Details of the striker mounting assembly case 12 are seen in FIGS. 6A, 6B and 6C. The receiving chamber 13 has a top channel 15 and a lower channel 20 aligned with the upper and lower alignment apertures 41, 43 in the inserted striker housing 16. A striker pin assembly 46 of the striker mounting assembly 11 is then inserted as indicated by arrow 45, through the top channel 15 and upper aperture 41 in the top flange 40, through the striker loop 37 and through the lower alignment aperture 41 in the bottom flange 42 into the lower channel 20 in receiving chamber 13. The striker pin assembly 46 includes a capture spike 47 which is releasably retained in a latching mechanism 48. In the example implementation, a Mini Quick Release Latch by Quik-Latch Products is employed for the capture spike and latching mechanism.

The striker mounting assembly 11 may be employed in alternate implementations with a support structure having differing configuration and operation than that disclosed in the example implementation.

Figure 7A:
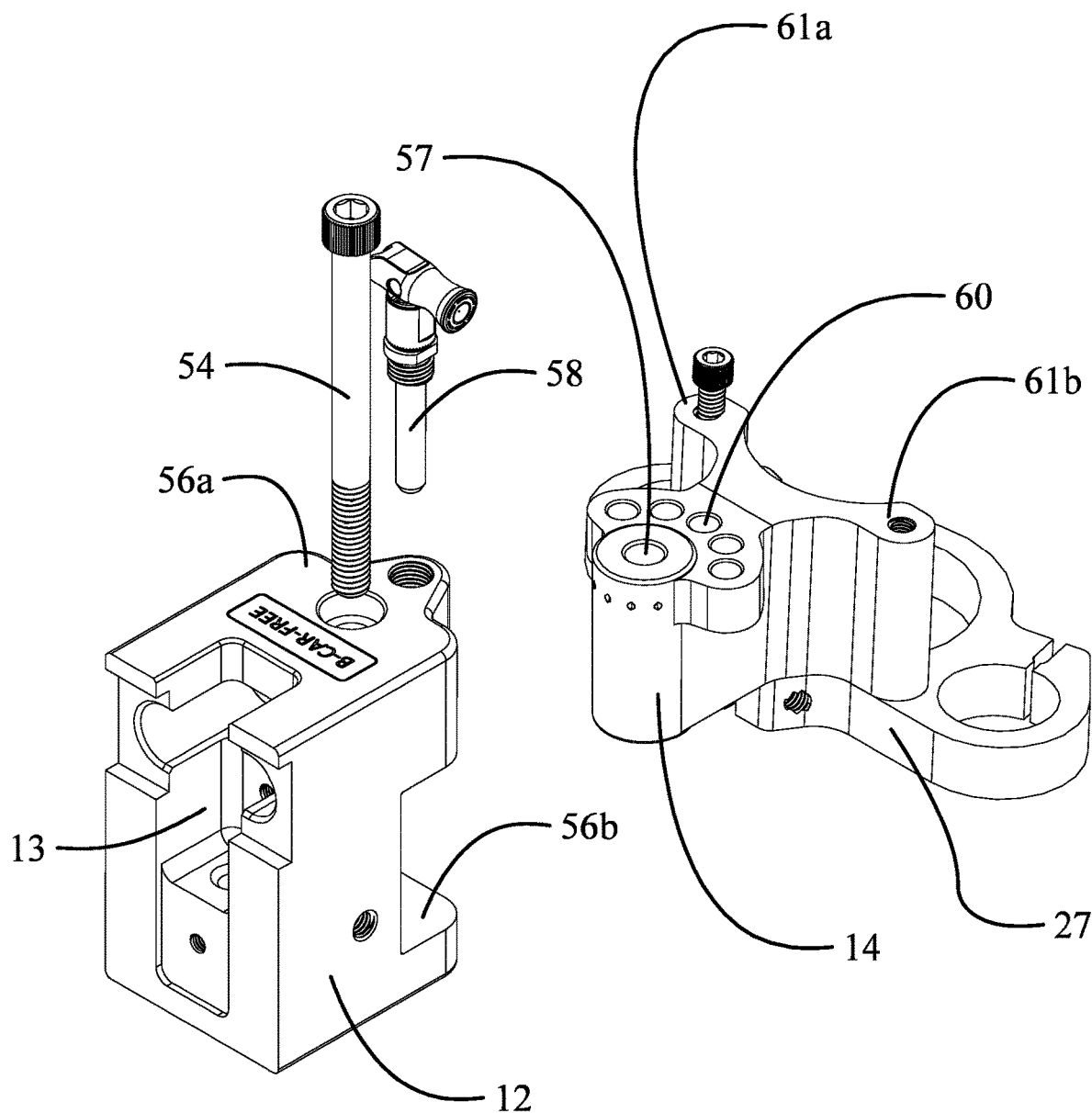
FIGS. 7A, 7B and 7C are rear left upper, front upper right and front lower right exploded pictorial view of the striker mounting assembly case and the pivot assembly.
Figure 7B:
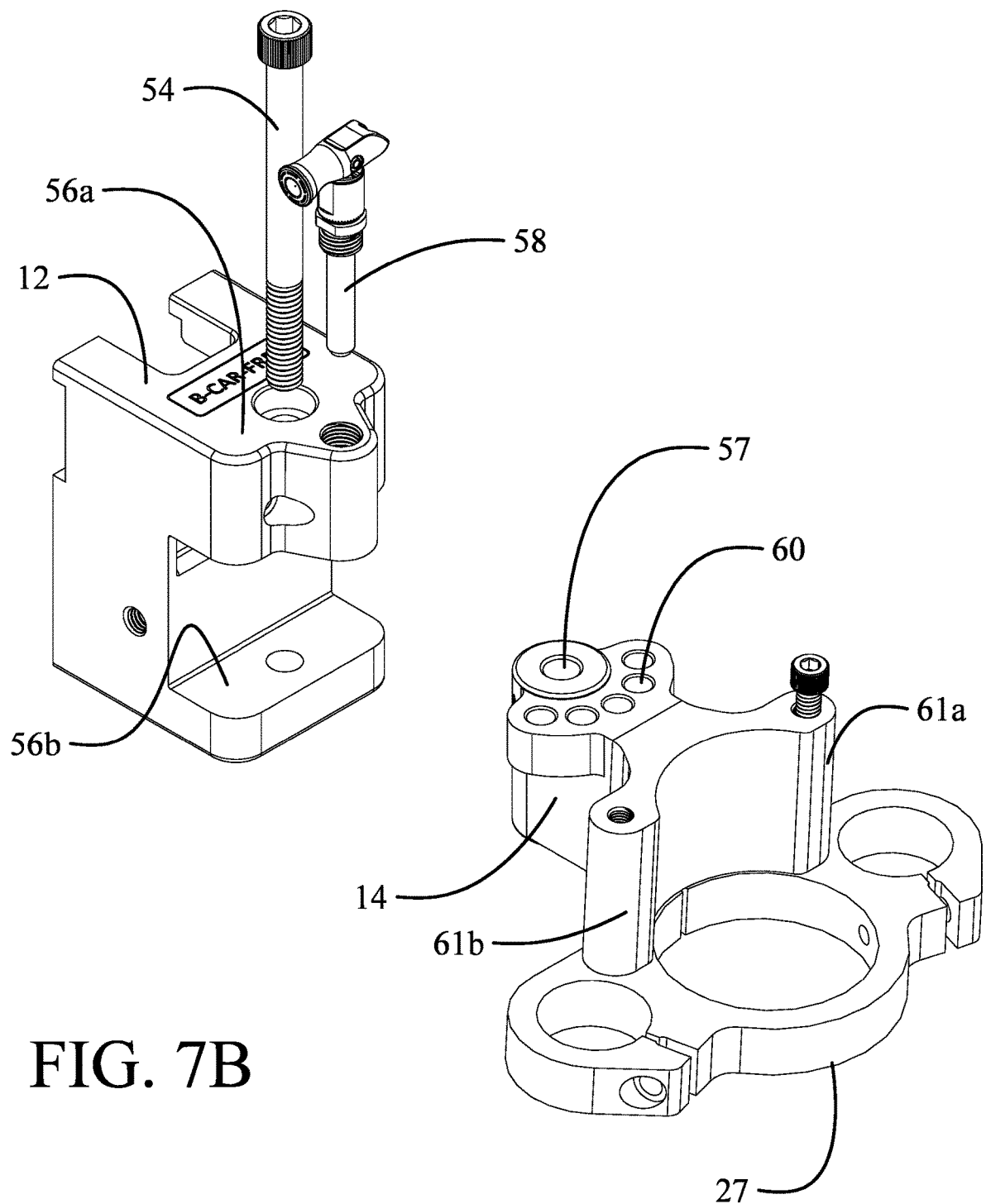
Figure 7C:
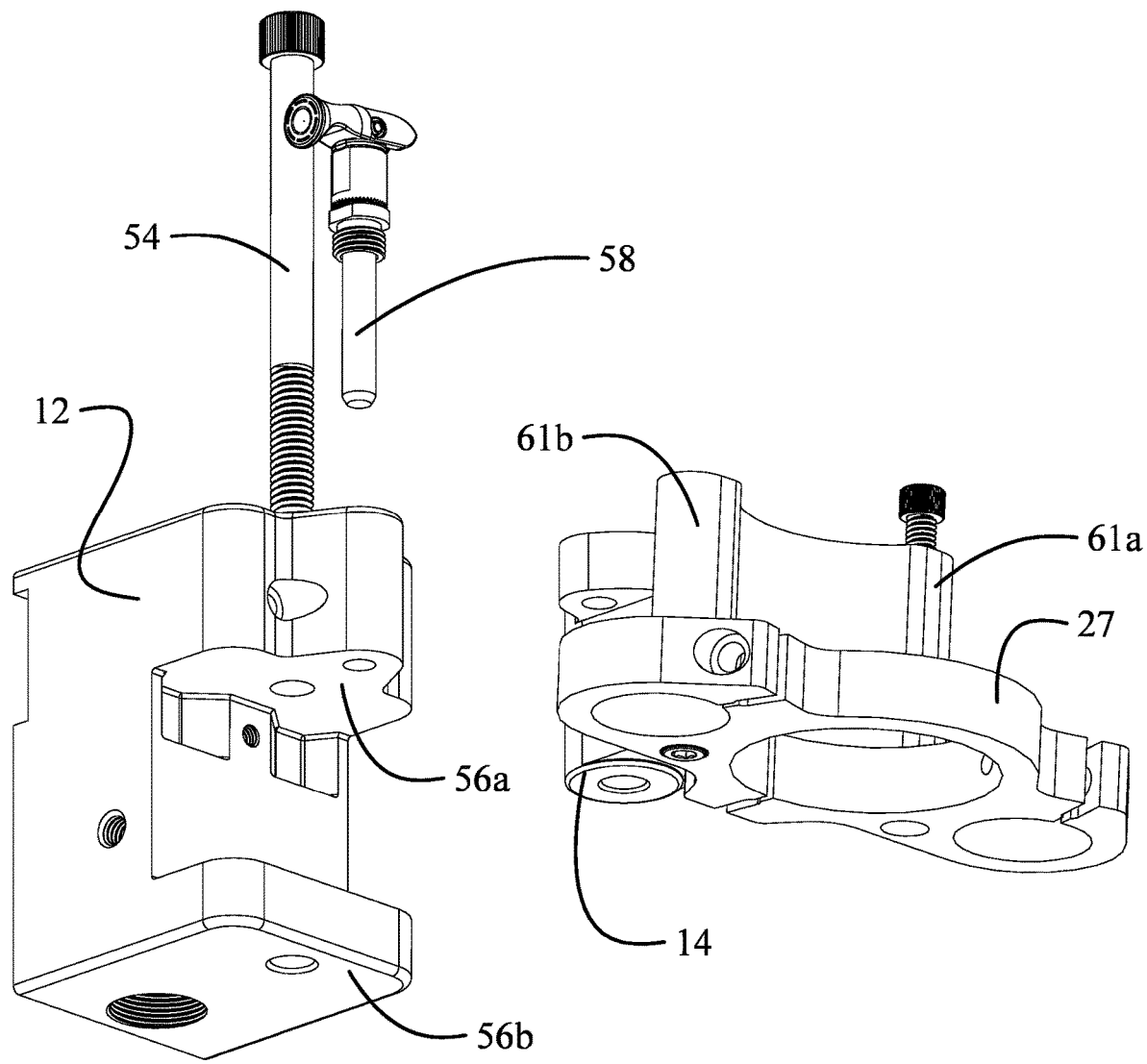

Details of the pivot assembly 14 are shown in FIGS. 7A-7C. A pivot pin 54 is removably inserted through an upper flange 56*a* extending from the case 12 through a bore 57 in the pivot assembly 14 and into a lower flange 56*b* extending from the case 12. Pivot assembly 14 has a semicylindrical profile for clearance and is rotatable about pivot pin 54 in case 12. A lock pin 58 is removably insertable through the upper flange 56*a* to engage a selected one of a plurality of positioning bores 60 in the pivot assembly 14. The pivot assembly 14 is engaged to the case 12 by inserting the pivot assembly between the upper and lower flanges 56*a*, 56*b*, as demonstrated by arrow 59 in FIG. 4B, and inserting the pivot pin 54 into the bore 57. Attachment wings 61*a* and 61*b* are configured for bolted attachment of the triple clamp 27 to attach the mounting structure 24 to the pivot assembly 14.

Figure 8:
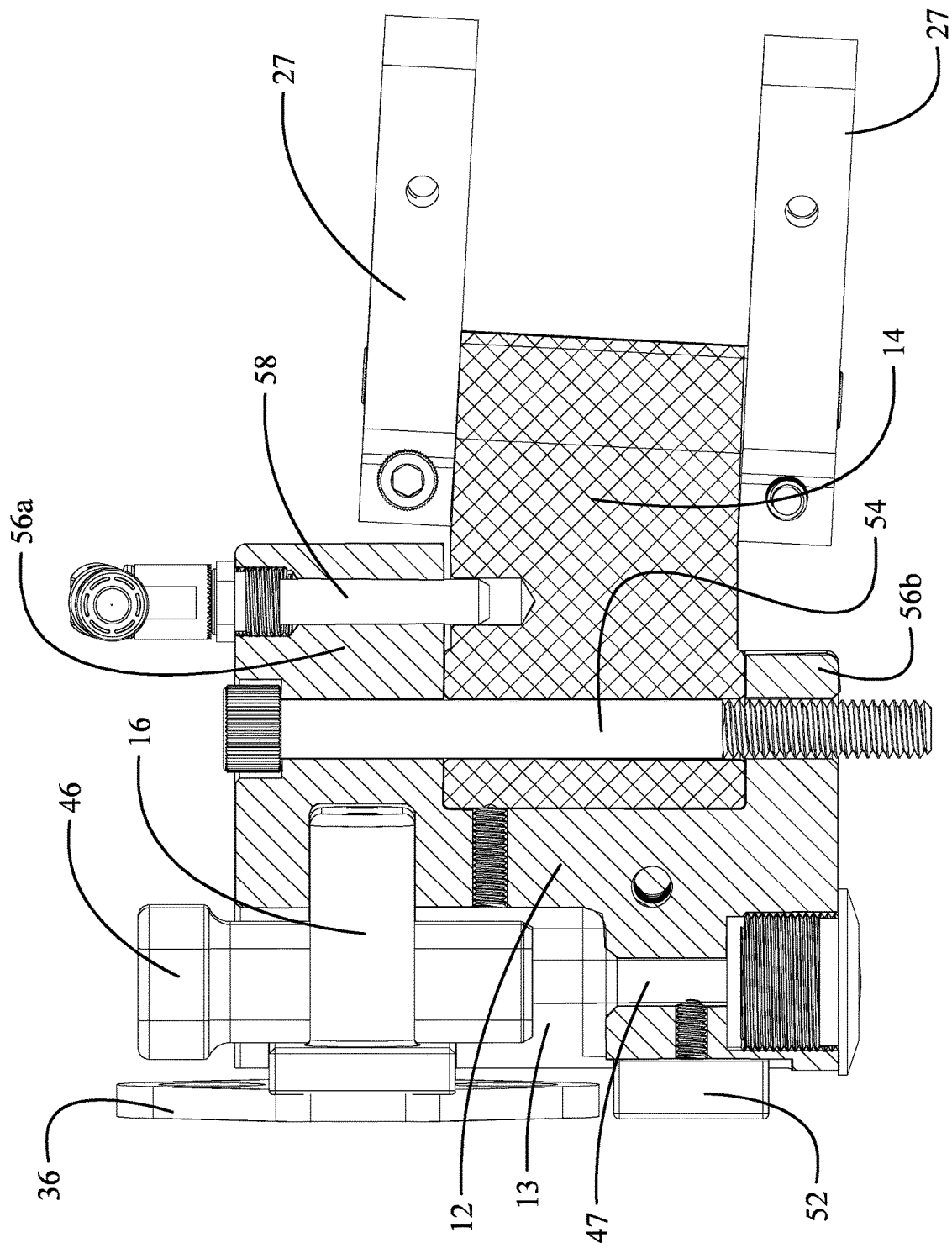
FIG. 8 is a side section view of the fully assembled striker, striker mounting assembly and pivot assembly.

FIG. 8 provides a section view of the assembled striker mounting assembly 11, with case 12, striker housing 16, striker 36 and striker pin assembly 46. The example employs a square cross section for the striker pin assembly 46 and alignment channel 20 to fix the relative alignment of the striker mounting assembly 11 and striker housing 16 with the striker 36. In alternative implementations other geometric cross sections may be employed with a preferred cross section having flat sides approximately parallel to sides and a loop of the striker to resist rotation of the pin assembly in the striker.

Figure 10A:
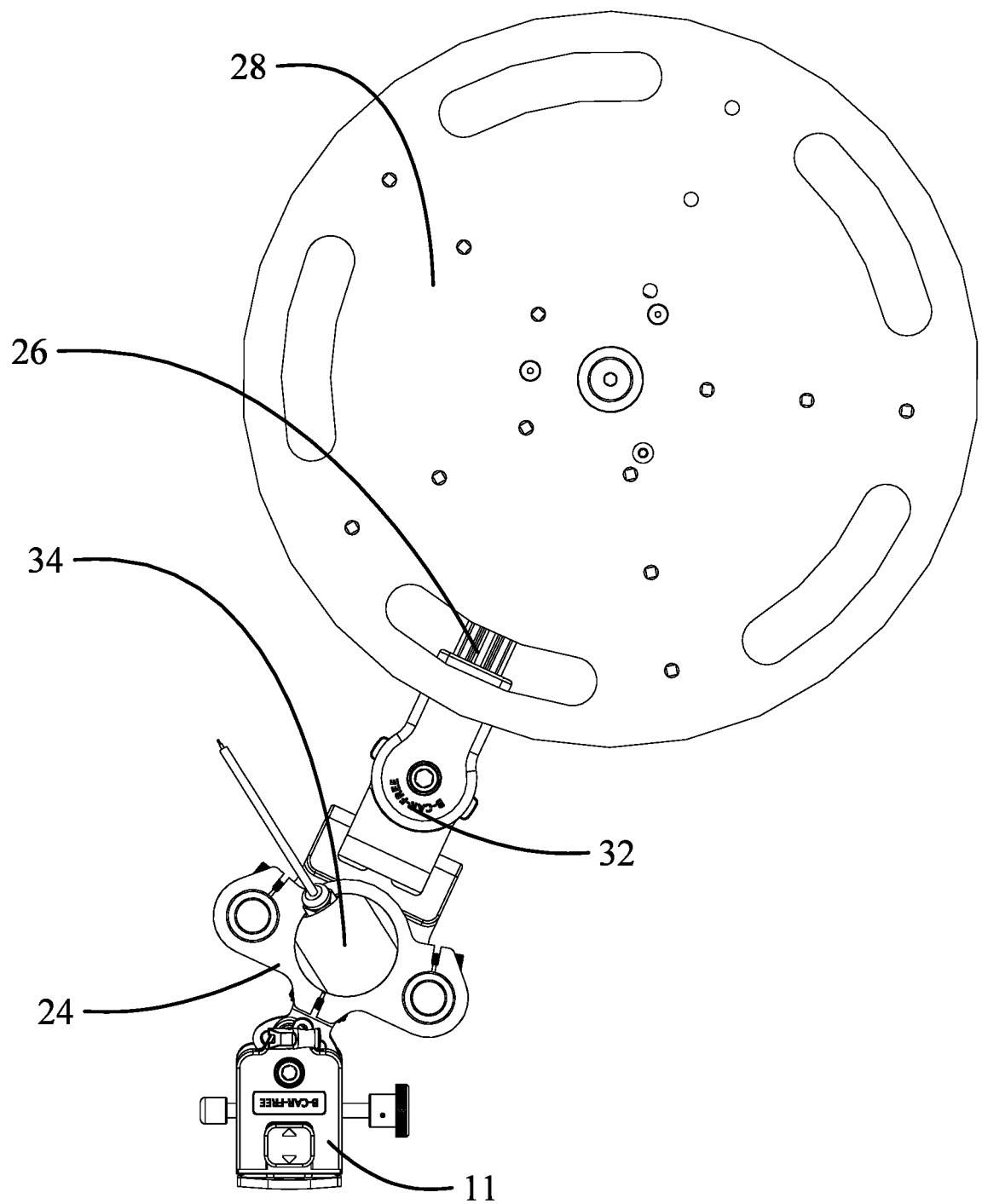
FIGS. 10A and 10B show the lift assembly rotated outward and aligned, respectively; and, FIG. 11 is a schematic diagram of power connection for actuator operation in the lift assist device.
Figure 10B:
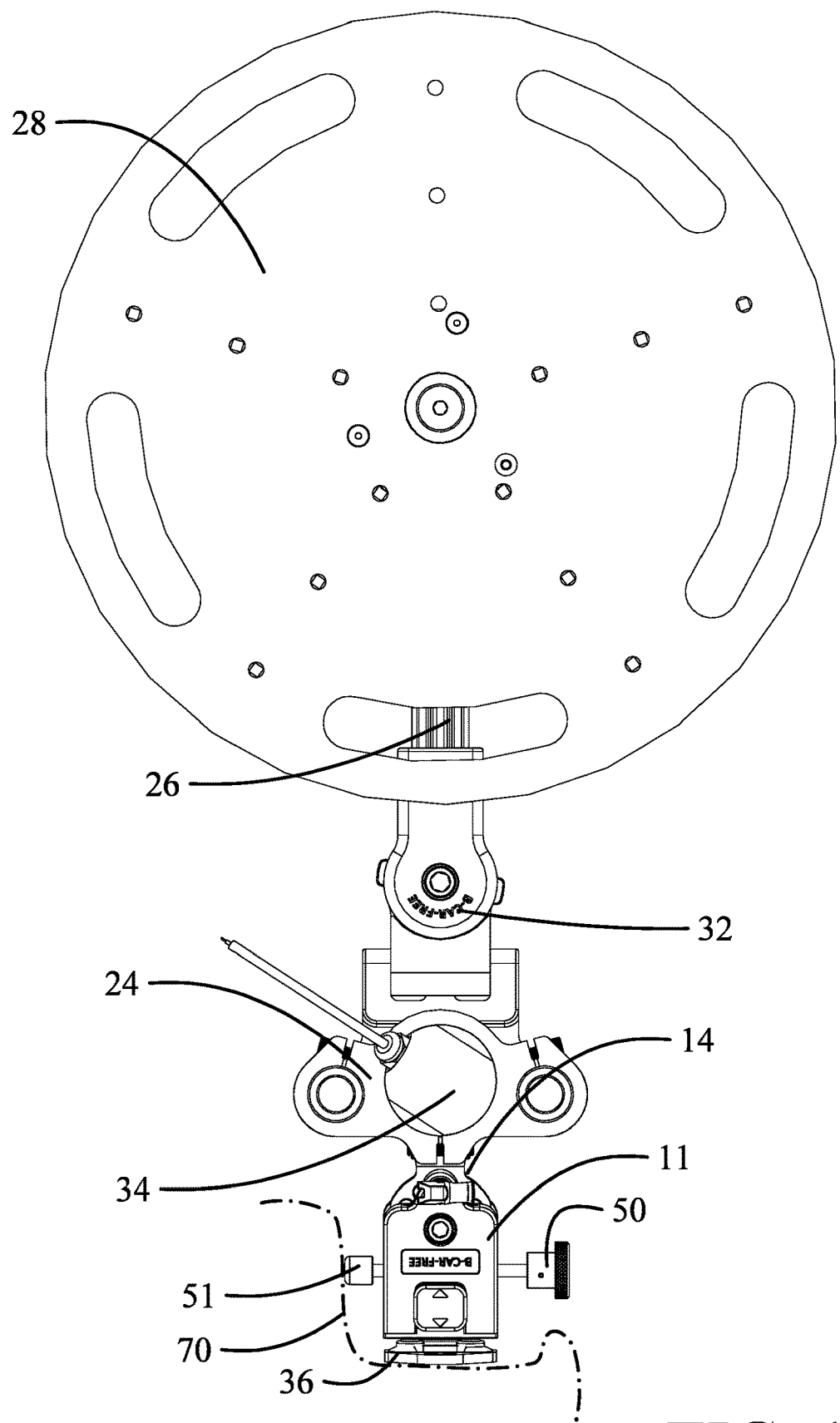

The striker mounting assembly case 12 receives an alignment screw 50, (seen in FIG. 3), which for the example is a bolt threaded through a bore in the case 12 with a knurled head for manual adjustment extending from the case 12, to engage the lateral surface of the door frame to adjust the striker housing 16 (and assembled striker mounting assembly 11) plumb with respect to the door frame. A cap 51 is engaged on a terminal end of the alignment screw 50 to provide a non-marring contact surface on the door frame (as seen in FIG. 10B). Additionally, a resilient pad 52 is secured to a rear face of the case 12 to engage the door frame to prevent marring of the frame. In the example implementation a Delrin® pad is employed. In alternative implementations one or more articulating push-pull clamps associated with the striker mounting assembly case 12 may be employed for adjustment.

Figure 9A:
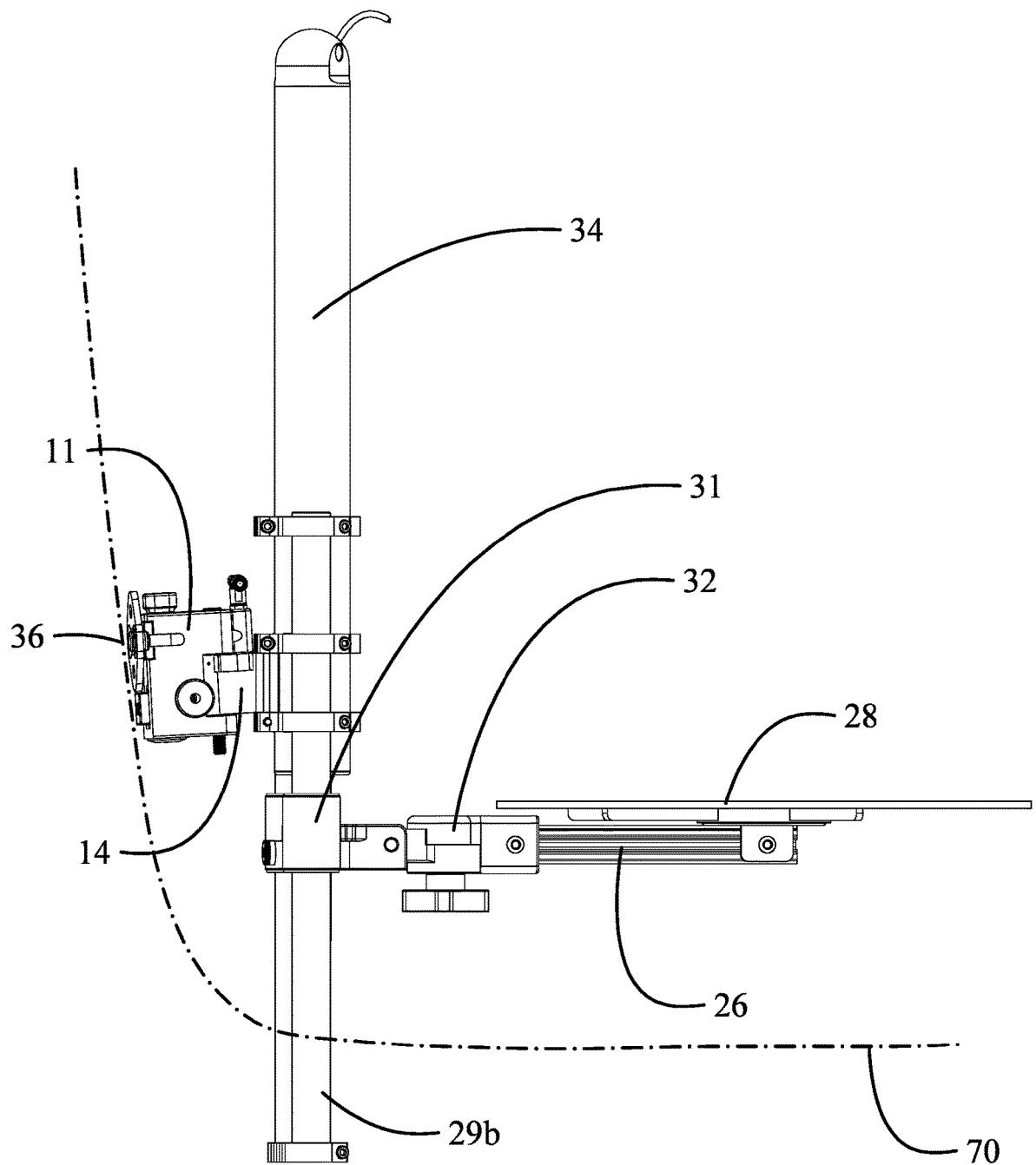
FIGS. 9A and 9B are side views of the mounted lift assist device in the retracted and extended positions, respectively.

With the striker mounting assembly 11 and striker housing 16 assembled on the striker 36 as seen in FIG. 9A (with door frame 70 shown in phantom), the lift assembly 22 is attached by inserting the pivot pin 54 through the upper flange 56*a* extending from the case 12 through the bore 57 in the pivot assembly 14 and into the lower flange 56*b* extending from the case 12, as previously described. Support arm 26 and the attached seat 28 depend from the mounting structure 24. The semicylindrical profile of pivot assembly 14 is rotatable about pivot pin 54 in case 12 allowing the lift assembly to be rotated outward (as shown in FIG. 10A) to provide clearance for the seat 28 for loading the user and lifting past the door sill to position the seat 28 next to the car seat. The stop pin 58 is removably insertable through the upper flange 56*a* to engage a selected one of a plurality of positioning bores 60 in the pivot assembly 14 for the desired angle of rotation. The pivot assembly 14 is rotatable either direction for use on right or left side doors of the vehicle.

Figure 9B:
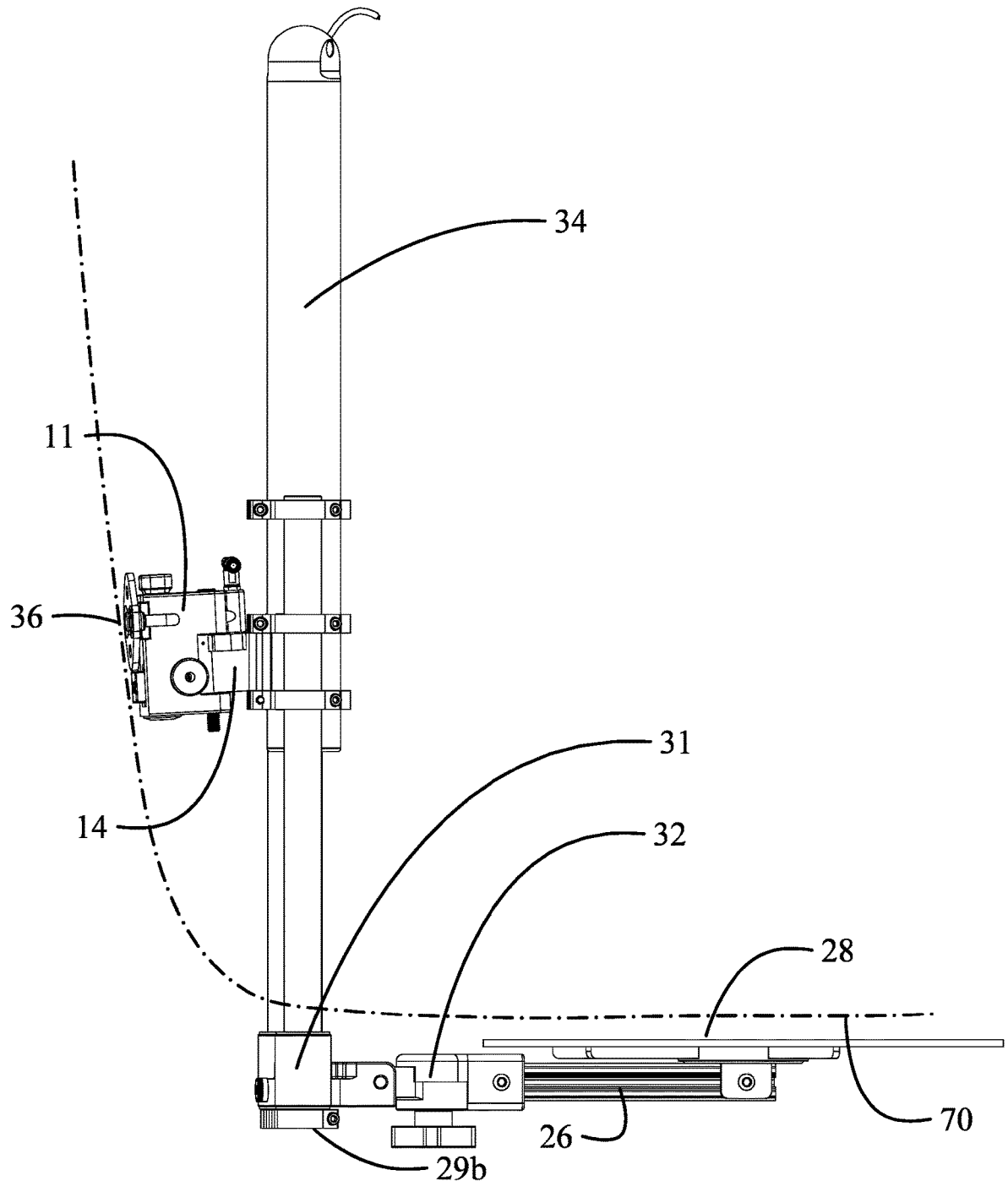

As shown in FIG. 9B, the telescoping support arm is extended to lower the seat 28. The actuator 34, which may be a cable drive linear actuator or similar device, is employed to extend and retract the telescoping support arm 26. After the user is seated, the actuator retracts the support arm 26 raising the seat to be level with the car seat. The lift assembly 22 may then be rotated inward on pivot pin 54 (as seen in FIG. 10B) to align the seat 28 and car seat for easy transfer of the user into the car seat.

When loading of the user is complete, the lift assembly 22 is removed by extracting the striker pin assembly 46 from the case 12 of the striker mounting assembly 11. The striker mounting assembly 11 is then removed from the striker 36 allowing normal operation of the door latch in the striker. The striker pin assembly 46 striker mounting assembly 11 and lift assembly 22 may be easily stored in the vehicle. The lift assembly 22 and pivot assembly 14 may be disassembled from the striker mounting assembly 11, if desired, by removal of the pivot pin 54 and lock pin 58. For unloading the user, striker mounting assembly 11 with the striker housing 16, and the pivot assembly 14 with lift assembly 22 are reassembled on the striker 36 and are operable to unload the user.

Figure 11:
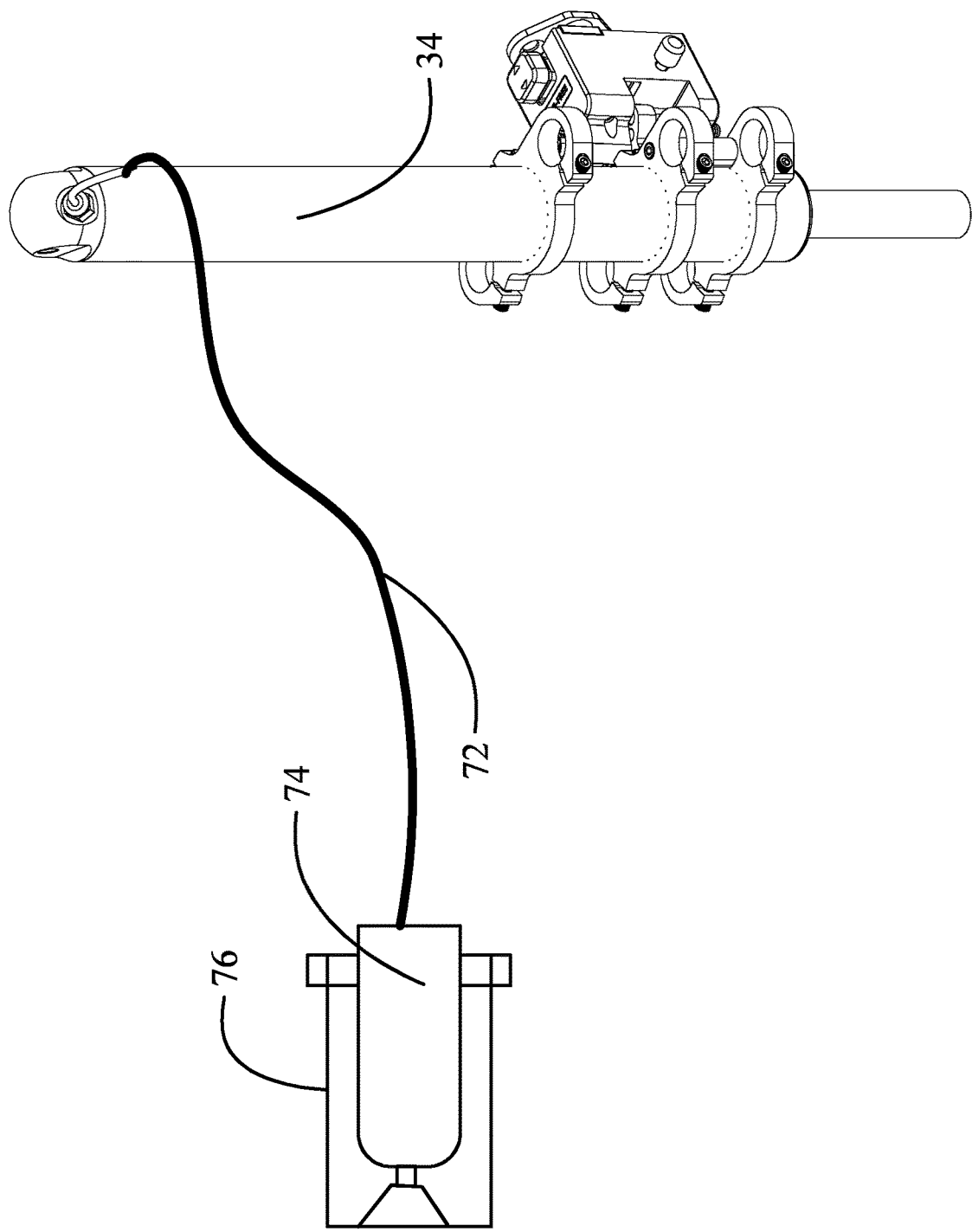

As seen in FIG. 11, the actuator 34 is powered, in the example shown, by a power cord 72 and DC adapter 74 which may be plugged into a power port 76 in the vehicle.

The striker housing 16 for the striker mounting assembly 11 may be provided in multiple sets for engaging different configurations of the striker 36 in various vehicles. Additionally, in certain implementations, the striker mounting assembly 11 may be configured with shaping of the striker pin assembly 46, for close engagement of the striker 36 and combination with a striker housing may not be required.

Having now described various embodiments of the invention in detail as required by the patent statutes, those skilled in the art will recognize modifications and substitutions to the specific embodiments disclosed herein. Such modifica- tions are within the scope and intent of the present invention as defined in the following claims.

What is claimed is:

1. A lift assist device comprising:
   a striker mounting assembly having
   a case with a receiving chamber having a top channel and a lower channel;
   a striker housing removably insertable in the receiving chamber and having a receiver adapted to be inserted over a striker on a door of a vehicle, said striker housing having a top flange with an upper alignment aperture and a bottom flange with a lower alignment aperture, said upper alignment aperture and lower alignment aperture aligned with the top channel and lower channel with the striker housing inserted in the receiving chamber;
   a striker pin assembly adapted for removable insertion through the top channel and upper alignment aperture into a striker on a door of a vehicle and through the lower aperture into the lower channel;
   a pivot assembly engaged to the case with a pivot pin;
   a lift assembly having
   a mounting structure engaged to the pivot assembly;
   a telescoping support arm depending from the mounting structure; and
   a seat attached to a terminal end of the telescoping support arm.

2. The lift assist device as defined in claim 1, wherein the striker pin assembly has a geometric cross section having flat sides parallel to sides and an end of the striker to resist rotation of the pin assembly in the striker.

3. The lift assist device as defined in claim 2, wherein the striker pin assembly further comprises a capture spike releasably retained in a latching mechanism in the case.

4. The lift assist device as defined in claim 3, further comprising an alignment screw threaded through a bore in the case and extending from the case to engage a lateral surface of a door frame to adjust the striker housing plumb with respect to the door frame.

5. The lift assist device as defined in claim 1; wherein the pivot assembly is engaged to the case by inserting the pivot assembly between an upper and a lower flange extending from the case, the pivot pin removably inserted through the upper flange through a bore in the pivot assembly and into the lower flange.

6. The lift assist device as defined in claim 1, wherein the pivot assembly has a semicylindrical profile for clearance and is rotatable about the pivot pin and further comprises a lock pin removably insertable through the upper flange to engage a selected one of a plurality of positioning bores in the pivot assembly.

7. The lift assist device as defined in claim 1, further comprising an actuator attached to the mounting structure in operative engagement with the telescoping support arm to extend and retract the support arm.

8. The lift assist device as defined in claim 7, wherein the pivot assembly is connected to at least one triple clamp, the actuator rigidly engaged in the at least one triple clamp and the mounting structure comprises parallel tubes constrained in the at least one triple clamp and a link bracket connecting the telescoping support arm and the seat, said link bracket reciprocating on the parallel tubes with extension and retraction of the telescoping support arm.

9. The lift assist device as defined in claim 8, further comprising a top clamp secured to the actuator and rigidly attached to a top termination of the parallel tubes and a bottom rigidly attached to a bottom termination of the parallel tubes.

10. The lift assist device as defined in claim 8, wherein the seat is attached to the link bracket with an articulation mechanism whereby the seat folds for compact storage.

11. A door attachment mechanism for a lift assembly, said mechanism comprising:
    a striker mounting assembly having
    a case with a receiving chamber having a top channel and a lower channel;
    a striker housing removably insertable in the receiving chamber and having a receiver adapted to be inserted over a striker on a door of a vehicle, said striker housing having a top flange with an upper alignment aperture and a bottom flange with a lower alignment aperture, said upper alignment aperture and lower alignment aperture aligned with the top channel and lower channel with the striker housing inserted in the receiving chamber; and,
    a striker pin assembly adapted for removable insertion through the top channel, upper alignment aperture into a striker on a door of a vehicle and through the lower aperture into the lower channel.

12. The door attachment mechanism as defined in claim 11, wherein the striker pin assembly has a geometric cross section having flat sides parallel to sides and an end of the striker to resist rotation of the pin assembly in the striker.

13. The door attachment mechanism as defined in claim 11, wherein the striker pin assembly further comprises a capture spike releasably retained in a latching mechanism in the case.

14. The door attachment mechanism as defined in claim 11, further comprising an alignment screw threaded through a bore in the case and extending from the case to engage a lateral surface of a door frame to adjust the striker housing plumb with respect to the door frame.

15. The door attachment mechanism as defined in claim 11, further comprising a pivot assembly engaged to the case by inserting the pivot assembly between an upper and a lower flange extending from the case; and a pivot pin removably inserted through the upper flange through a bore in the pivot assembly and into the lower flange.

16. The door attachment mechanism as defined in claim 15, wherein the pivot assembly has a semicylindrical profile for clearance and is rotatable about pivot pin and further comprising a lock pin removably insertable through the upper flange to engage a selected one of a plurality of positioning bores in the pivot assembly.

* * * * *